UNITED STATES PATENT OFFICE.

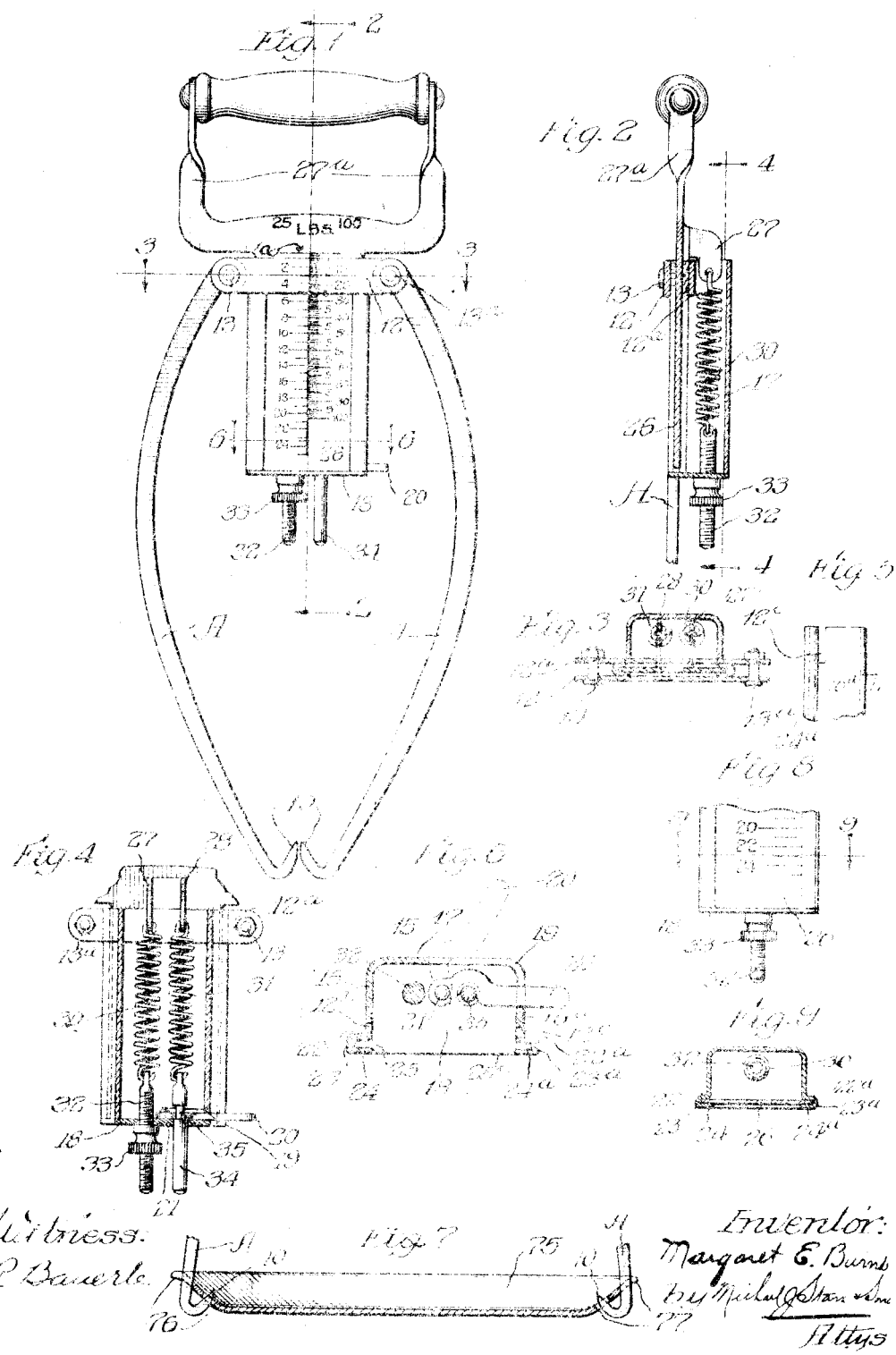
M. E. BURNS.
WEIGHING TONGS.
APPLICATION FILED APR. 17, 1915.
1,183,428.
Patented May 16, 1916.

MARGARET E. BURNS, OF CHICAGO, ILLINOIS.

WEIGHING-TONGS.

1,183,428.

Specification of Letters Patent.

Patented May 16, 1916.

Application filed April 17, 1915. Serial No. 22,166.

*To all whom it may concern:*

Be it known that I, MARGARET E. BURNS, a citizen of the United States, and a resident of the city of Chicago, in the county of Cook and State of Illinois, have invented a certain new and useful Improvement in Weighing-Tongs; and I do hereby declare that the following description of my said invention, taken in connection with the accompanying sheet of drawing, forms a full, clear, and exact specification, which will enable others skilled in the art to which it appertains to make and use the same.

My invention relates generally to improvements in weighing tongs, and it consists, essentially, in the novel and peculiar combination of parts and details of construction, as hereinafter first fully set forth and described and then pointed out in the claims.

Referring to the drawing hereinbefore indicated, Figure 1 indicates a side elevation of my newly invented weighing tongs for weights of 100 pounds or thereabouts. Fig. 2 is a vertical section in line 2—2 of Fig. 1. Fig. 3 is a horizontal section in line 3—3 in Fig. 1. Fig. 4 is a vertical section in line 4—4 of Fig. 2. Fig. 5 is a fragment of a side elevation of Fig. 3, with certain parts removed. Fig. 6 is a plan in line 6—6 of Fig. 1. Fig. 7 illustrates a pie plate or the like adapted to be attached to the lower end of the tongs shown in Fig. 1 to convert the device into a household weighing scales. Fig. 8 indicates a spring box of smaller dimensions for scales of lesser capacity, and Fig. 9 is a section in line 9—9 of Fig. 8.

Like parts are indicated by corresponding characters or symbols in all the figures of the drawing.

The essence of my invention is the production of a scale of a capacity to weigh 100 pounds of ice; in fact a combined ice tong and scale; and, in addition thereto are combined novel and efficient means, whereby the device may be employed as a domestic or household scale for the weighing of meats, vegetables and all other houshold specialties purchased by weight.

Referring to Fig. 1, A and A' are tong members similar to the like members on regulation ice tongs, and, possessed of the inwardly and upwardly projecting points 10. The upper end of these tong members are pivoted between the opposite ends of a pair of connecting bars 12 and 12ª, at the outer ends thereof, by means of flattened rivets 13 and 13ª. Fitted between these bars 12 and 12ª, medially of the length of said bars is fitted a scale spring box 15 shown in plan. This box is essentially rectangular in plan and possesses two sides 16 and 16ª, a back 17, a bottom 18. In the side 16ª and back 17, contiguous to the bottom 18 there is a slot 19 through which the lever 20 is adapted to oscillate about its pivot 21.

The front end of the spring scale box 15 has an open front, with its front edges bent outwardly a short distance as at 22 and 22ª, the full length of the box; then bent away from but parallel to the box a short distance as at 23 and 23ª and then rebent as at 24 and 24ª to a point opposite the open front, the operations described forming oppositely placed grooves 25 and 25ª, for the reception of a movable scale beam 26 freely slidable therein. And it may now be added that the width of the walls 22 and 24 and the groove 25 is the width of one of the scale tongs and that bar 12ª already described fits in slots 12ᵇ and 12ᶜ located near the upper end of the side walls 16 and 16ª contiguous to the outwardly bent members 22 and 22ª, so that said bars are flush with the top of the spring box 15, and is fixed in place by brazing, soldering or other suitable means. The duplicate connecting bar 12 is also brazed or riveted to the members 24 and 24ª, so that the rivets 13 and 13ª will pass accurately through the openings in the ends of the bars 12 and 12ª.

The scale beam bar 26 already mentioned slides freely upward and downward in the grooves 25 and 25ª and is provided at its upper end with a suitable handle 27ª whereby the same may be grasped by a hand.

Projecting rearwardly from the scale beam bar and resting on the top edge of bar 12ª when the lower end of the scale beam bar is at its lowest point in the scale beam and spring box 15 are a pair of well fastened fingers 27 and 28; one of which fingers engages the upper end of spring 30 and the other the like end of spring 31. The lower end of spring 30 is hooked to the end of a threaded stud 32, which passes through the bottom 18 of the beam and spring box 15, and is controlled underneath said box bottom 18 by a thumb nut. The spring 31 is attached to a round stud, likewise passing through bottom 18, but said stud has a groove 35 near its upper end, which is adapted to be engaged or disengaged by a swinging lever Figs. 3 and 4.

It is now to be announced that the springs 30 and 31 are disposed longitudinally on either side of the medial line of the bars 12 and 12ª, and on the forward face of the scale beam bar 26 are two courses of scale graduations: 1ˢᵗ scale, that opposite and in front of spring 30, reading to 25 pounds inclusive, that being the limit of that scale. Spring 31, however, has a weighing capacity of 75 pounds, so that when the two springs are working in conjunction, the weighing of 100 pounds of material will be possible, and in reading the weights, the scale graduations showing the higher figures are employed.

Now when it is desired to use the scales for weights under 25 pounds, the lever 20 Fig. 4 is swung to the position shown in dotted lines, the spring 31 is cut away from action, in a manner easily understood, and the lighter spring 30 will be caused to do the work. If the line 1 is at the top of the scale beam is not flush with the upper edge of the bar 12, then a slight adjustment of the thumb screw 33 will be necessary, after which the scale is ready for light weight action.

In Fig. 7 is indicated a sheet metallic pan 75, having oppositely arranged openings 76 and 77 for the reception of the points 10 of the tong members A and A′. With this pan in place, all household necessities may be weighed with facility, and by swinging in the lever 20, the capacity of the scale beam, as they really are, is at once increased to 100 pounds.

I propose to construct many of the scales with the springs for weighing 25 pounds only. In such cases I propose to reduce the beam and spring box considerably in size, all as seen in Figs. 8 and 9 and employ only one set of readings on the beam thereof.

These devices will be well made, neatly japanned, or nicely nickeled in any of which finishes it will prove invaluable to the housewife, in keeping account of false weights practised by many merchants.

I have hereinbefore disclosed the preferred mode of practising my invention, but I reserve the right to make such and any changes as might occur to one skilled in the art to which this invention appertains, or to make any and all such alterations as may be permitted under the doctrine of equivalents.

Having thus fully described my invention I claim as new, and desire to secure to myself by Letters Patent of the United States:—

1. In combination, a pair of tongs, a pair of parallel, spaced apart, longitudinal bars embracing said tongs at one end of each of said tongs, a depending receptacle fixed to said bars, a slide uprightly movable in said receptacle, a helical spring in said receptacle, with its lower end fastened therein and its upper end fixed to said slide to resist upward movement thereof, and a carrying handle at the upper end of said slide.

2. In combination, a pair of tongs, a pair of parallel, spaced apart, longitudinal bars embracing said tongs at one end of each of said tongs, a depending receptacle fixed to said bars, a slide uprightly movable in said receptacle, a helical spring in said receptacle, with its lower end adjustably fastened therein, and its upper end fixed to said slide to resist upward movement thereof, and a carrying handle at the upper end of said slide.

3. In combination, a pair of tongs, a pair of parallel, spaced apart, longitudinal bars embracing said tongs at one end of each of said tongs, a depending receptacle fixed to said bars, a slide uprightly movable in said receptacle, a helical spring in said receptacle, with its lower end fastened therein, and its upper end fixed to said slide to resist upward movement thereof, and a carrying handle at the upper end of said slide, said slide having graduations thereon in a direct relationship to the upper edges of said spaced apart longitudinal bars.

4. In combination, a pair of tongs, a pair of parallel, spaced apart, longitudinal bars embracing said tongs at one end of each of said tongs, a depending receptacle fixed to said bars, a slide uprightly movable in said receptacle, a pair of helical springs in said receptacle, the lower end of one of which is adjustably arranged at the bottom of said receptacle, and the other of which is releasably connected thereto, the upper ends of said springs being affixed to said slide to resist upward movement thereof, and a handle connected to said slide.

5. In combination, a pair of tongs, a pair of parallel, spaced apart, longitudinal bars embracing said tongs at one end of each of said tongs, a depending receptacle fixed to said bars, a slide uprightly movable in said receptacle, a pair of helical springs in said receptacle, the lower end of one of which is adjustably arranged at the bottom of said receptacle, and the other of which is releasably connected thereto, the upper end of said springs being affixed to said slide to resist upward movement thereof, and a handle connected to said slide, and means to release said releasable spring from action.

6. In combination, a connecting member, tongs pivoted to and depending from said member at its ends thereof, an upright receptacle depending from and rigidly fixed to said member substantially medially of its length, a movable slide in connection with said receptacle, spring means in said receptacle and fixed thereto and to said slide, resisting upward movement of said slide, and a carrying handle on said slide.

In testimony that I claim the foregoing as my invention, I have hereunto set my hand.

MARGARET E. BURNS.